(12) United States Patent
Shozaki et al.

(10) Patent No.: US 10,225,420 B2
(45) Date of Patent: Mar. 5, 2019

(54) INFORMATION PROCESSING APPARATUS, PERIPHERAL DEVICE USE METHOD, AND COMPUTER PROGRAM

(71) Applicant: Konica Minolta, Inc., Chiyoda-ku, Tokyo (JP)

(72) Inventors: Toshiya Shozaki, Osaka (JP); Jun Shiraishi, Toyokawa (JP); Hideyuki Matsuda, Hirakata (JP); Mie Kawabata, Toyokawa (JP); Hiroyuki Ohno, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/646,129

(22) Filed: Jul. 11, 2017

(65) Prior Publication Data

US 2018/0020107 A1    Jan. 18, 2018

(30) Foreign Application Priority Data

Jul. 14, 2016   (JP) ................................. 2016-139108

(51) Int. Cl.
*H04N 1/00*         (2006.01)
*H04N 1/32*         (2006.01)

(52) U.S. Cl.
CPC ..... *H04N 1/00506* (2013.01); *H04N 1/00411* (2013.01); *H04N 1/00965* (2013.01); *H04N 1/32122* (2013.01); *H04N 2201/0094* (2013.01); *H04N 2201/3273* (2013.01)

(58) Field of Classification Search
USPC ....................................................... 358/1.15
See application file for complete search history.

(56) References Cited

U.S. PATENT DOCUMENTS

2010/0053676 A1\* 3/2010 Sugimoto ............. G06F 3/0238
                                                                358/1.15
2011/0279846 A1\* 11/2011 Nakashima ........ H04N 1/00244
                                                                358/1.13

FOREIGN PATENT DOCUMENTS

| JP | 2005-339146 A | 12/2005 |
| JP | 2008-271215 A | 11/2008 |
| JP | 2010-4127 A   | 1/2010  |
| JP | 2010-212993 A | 9/2010  |
| JP | 2011-134096 A | 7/2011  |

\* cited by examiner

*Primary Examiner* — Ngon B Nguyen
(74) *Attorney, Agent, or Firm* — Buchanan Ingersoll & Rooney PC

(57) ABSTRACT

An information processing apparatus includes: a display; a first processing unit; and a second processing unit, wherein the first processing unit includes a transmitter configured to transmit a first screen relating to first processing performed by the first processing unit to the second processing unit, the second processing unit includes a mounting section in which a peripheral device is mounted and a hardware processor, the hardware processor configured to: cause the display to selectively display either one of the first screen and a second screen relating to second processing performed by the second processing unit, and when the display displays the first screen, allow the peripheral device to be used for the first processing and, when the display displays the second screen, allow the peripheral device to be used for the second processing.

20 Claims, 17 Drawing Sheets

INFORMATION PROCESSING APPARATUS, PERIPHERAL DEVICE USE METHOD, AND COMPUTER PROGRAM

The entire disclosure of Japanese Patent Application No. 2016-139108 filed on Jul. 14, 2016 including description, claims, drawings, and abstract are incorporated herein by reference in its entirety.

BACKGROUND

Technical Field

The present invention relates to a technique for using a peripheral device in an information processing apparatus, such as an image forming apparatus.

Description of the Related Art

Image forming apparatuses having various functions such as copy, scan, and fax are widespread. Such image forming apparatuses maybe referred to as "multi function peripherals (MFPs)".

Late models of image forming apparatuses have come to additionally provide with such functions as a web browser, a web server, or optical character recognition (OCR).

The foregoing various functions are very often managed integrally by a single system (e.g., an operating system).

A plurality of systems may nonetheless be disposed in a single housing and the foregoing various functions maybe managed by different systems.

One possible configuration may include an MFP unit having a first operating system and a server unit having a second operating system. The MFP unit achieves the copy, scan, and fax functions, while the server unit achieves the web browser, web server, and OCR functions. This single housing may include one display that is shared between the MFP unit and the server unit.

Even later models of image forming apparatuses are equipped with an interface, such as a universal serial bus (USB), for connecting peripheral devices.

Even when attempts are made by a plurality of the foregoing functions to use a peripheral device, integral management of the functions by a single system substantially eliminates contention of access to a peripheral device by a plurality of functions.

Contention of access to a peripheral device is, however, highly likely to occur when the foregoing functions are managed by different systems.

Well-known techniques of sharing a single peripheral device among a plurality of apparatuses may be applied to the image forming apparatus. The following techniques are known to date.

JP 2008-271215 A discloses a USB hub as described below. Specifically, the USB hub includes an exclusive control unit disposed between USB host controllers and USB peripheral controllers. The USB peripheral controllers are cyclically granted a temporary right of use at any unit time interval. The USB hub is configured such that, when a communication is received from a first PC connected with a USB peripheral controller that has acquired the temporary right of use, the right of use is granted to a USB host controller connected with a first USB device with which the first PC communicates and the USB peripheral controller connected with the first PC. The USB hub is further configured such that a NAK response is sent to any communication with the first USB device from any PC other than the first PC.

JP 2011-134096 A discloses an image forming apparatus as describe below. The image forming apparatus is capable of communicating with an information processing apparatus and an operating unit through a USB interface. The image forming apparatus includes a changeover unit that changes a connection state of a USB device and a USB host via the USB interface. When it is determined that the image forming apparatus can communicate with the information processing apparatus through the USB interface and the information processing apparatus can control the operating unit, the changeover unit changes from a first connection state in which the image forming apparatus as a USB host is connected with the operating unit as a USB device to a second connection state in which the information processing apparatus as a USB host is connected with the operating unit as a USB device.

JP 2005-339146 A discloses an image forming apparatus as describe below. The image forming apparatus includes a connection changeover circuit. The connection changeover circuit connects, in advance, a downstream port with a USB host circuit over a USB connection line. DPS discovery is executed when a DSC that supports PictBridge is connected to the downstream port. When the DPS discovery is successful, the connection state between the DSC and the USB host circuit is maintained. In contrast, when a scanner that does not support PictBridge is connected and DPS discovery fails, the USB connection line is disconnected. After a lapse of a predetermined period of time, the USB connection line is connected and the scanner is connected with a USB hub circuit, and the scanner is thereby allowed to be recognized by a PC.

The known technique described above allows a single peripheral device to be shared among a plurality of systems (e.g., PCs) through performance of exclusive control.

A need nonetheless exists in an image forming apparatus including a plurality of systems, such as an MFP unit and a server unit, housed in a single housing for making peripheral devices easier to use for users than before.

SUMMARY

An object of the present invention is to make peripheral devices easier to use in an image forming apparatus including a plurality of systems housed in a single housing.

To achieve the abovementioned object, according to an aspect, an information processing apparatus reflecting one aspect of the present invention comprises: a display; a first processing unit; and a second processing unit, wherein the first processing unit includes a transmitter configured to transmit a first screen relating to first processing performed by the first processing unit to the second processing unit, the second processing unit includes a mounting section in which a peripheral device is mounted and a hardware processor, the hardware processor configured to: cause the display to selectively display either one of the first screen and a second screen relating to second processing performed by the second processing unit, and when the display displays the first screen, allow the peripheral device to be used for the first processing and, when the display displays the second screen, allow the peripheral device to be used for the second processing.

The hardware processor preferably causes the display to display a changeover image together with either one of the first screen and the second screen and, when the changeover image is selected while the first screen is being displayed, the hardware processor preferably causes the display to display the second screen in place of the first screen and when the changeover image is selected while the second screen is being displayed, the hardware processor preferably causes the display to display the first screen in place of the second screen.

Furthermore, when a need arises to display the second screen while the peripheral device is being used for the first processing, the hardware processor preferably causes the display to display the second screen after use of the peripheral device has been completed and, when a need arises to display the first screen while the peripheral device is being used for the second processing, the hardware processor preferably causes the display to display the first screen after the use of the peripheral device has been completed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the illustrated examples.

Figure 1:
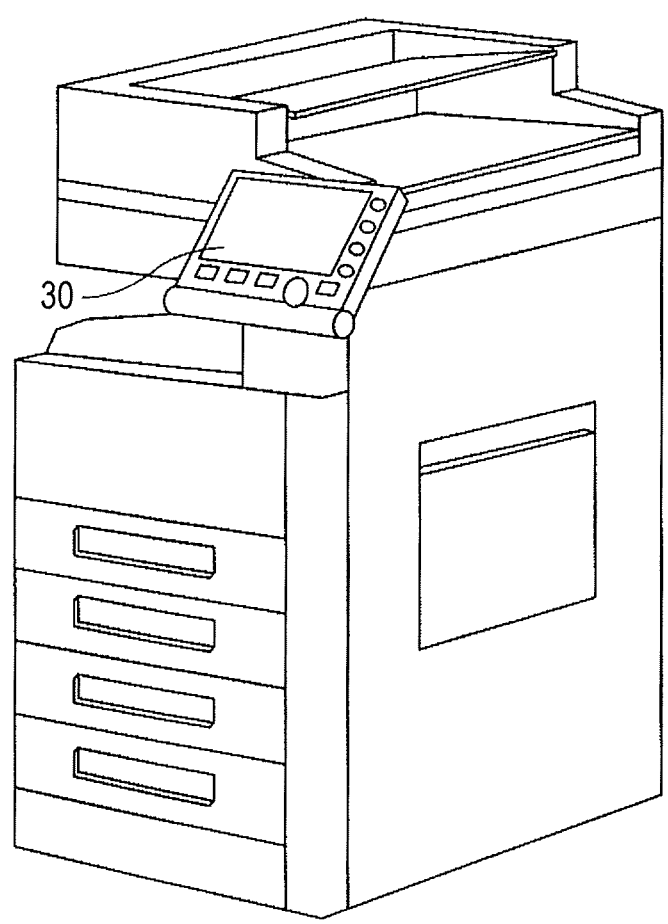
FIG. 1 is a diagram showing an exemplary appearance of an image forming apparatus according to an embodiment.
Figure 2:
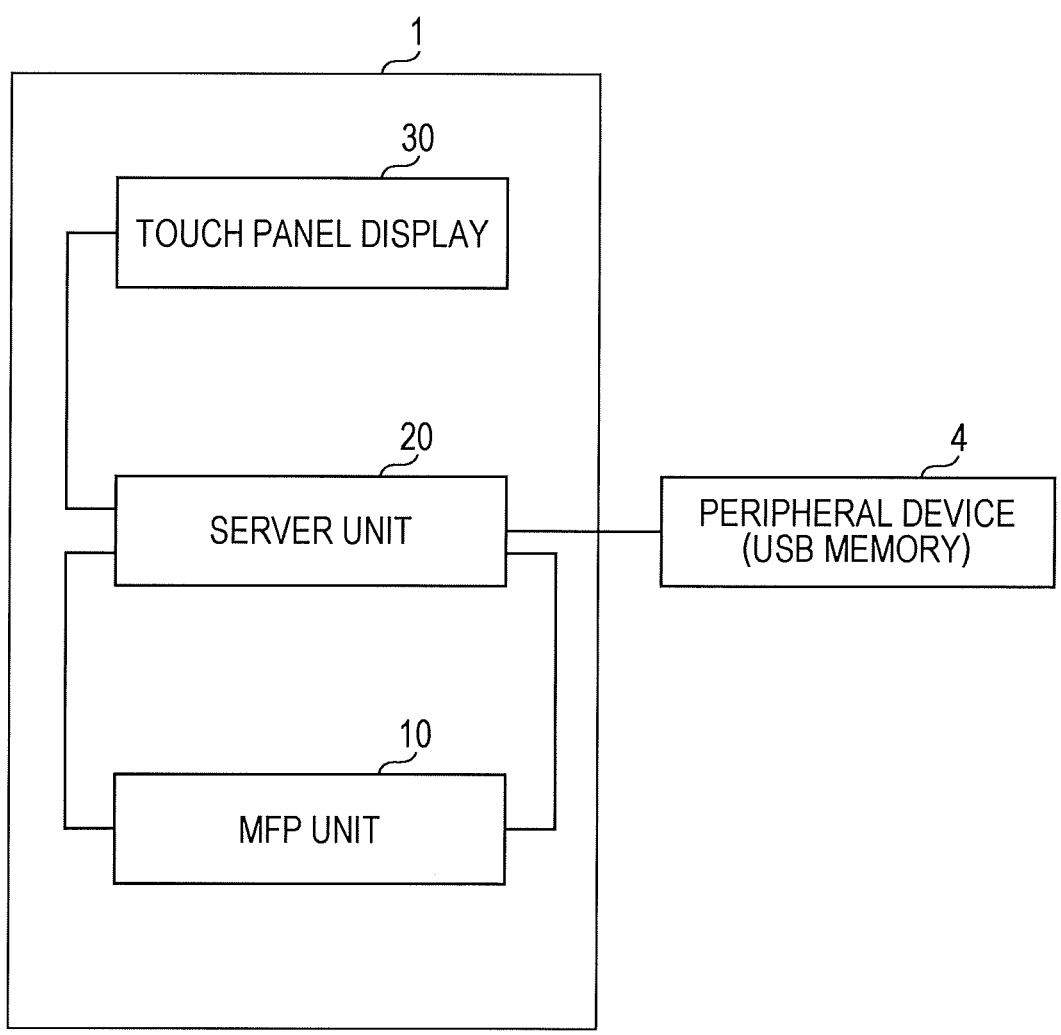
FIG. 2 is a diagram showing an exemplary general configuration of the image forming apparatus in the embodiment.
Figure 3:
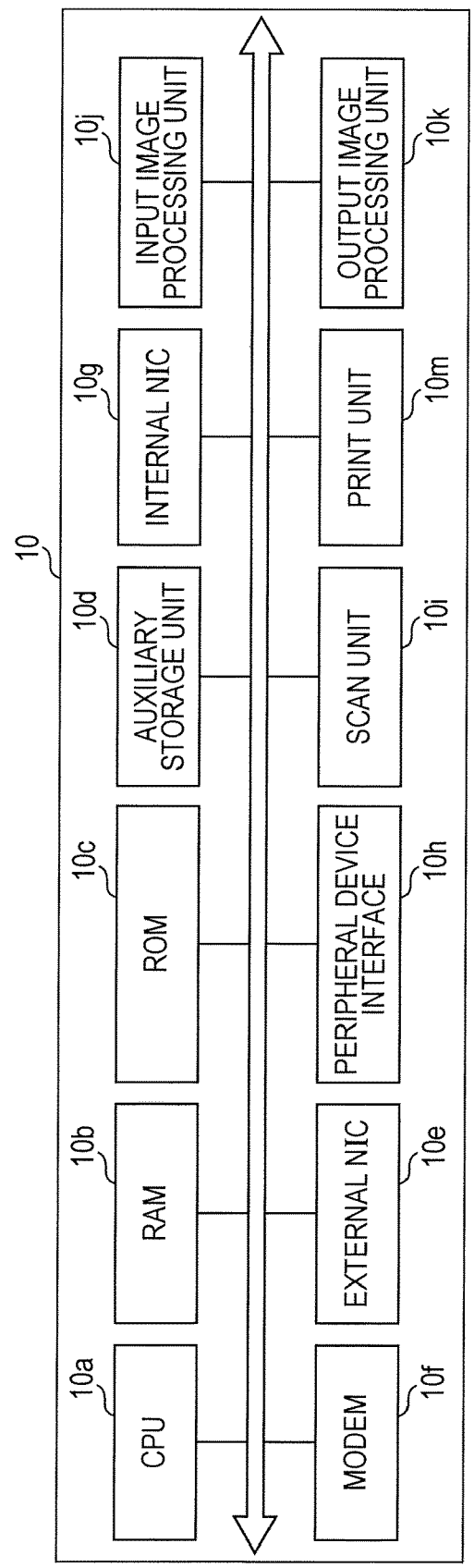
FIG. 3 is a diagram showing an exemplary hardware configuration of an MFP unit.
Figure 4:
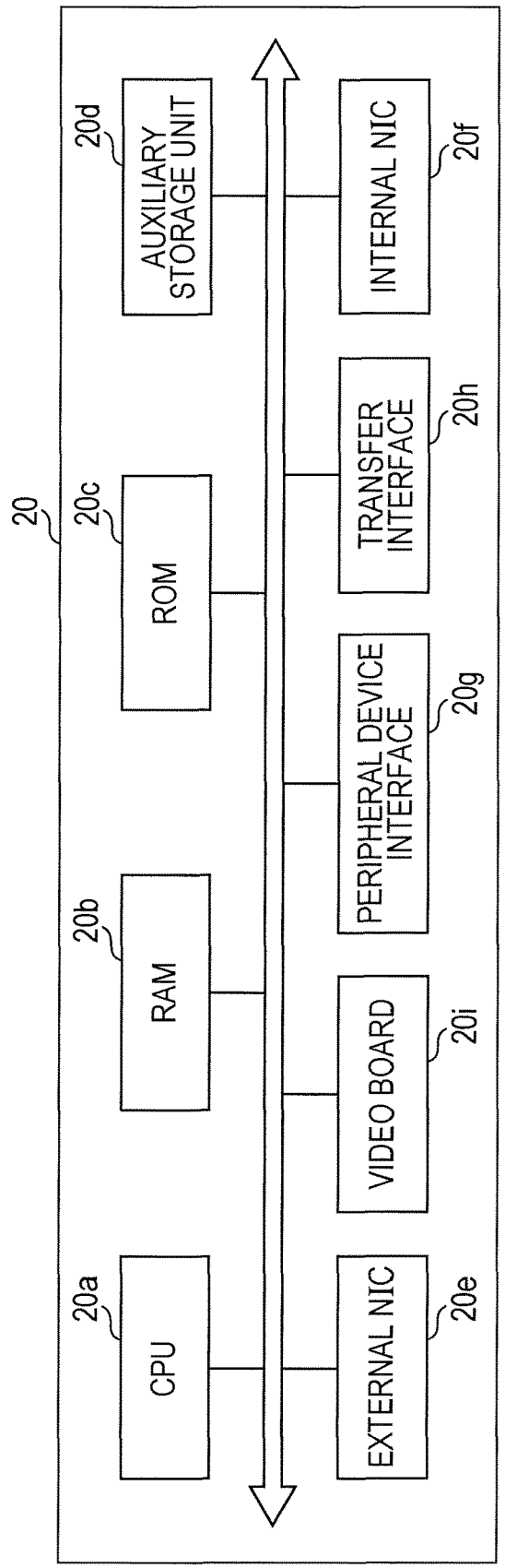
FIG. 4 is a diagram showing an exemplary hardware configuration of a server unit.
Figure 5:
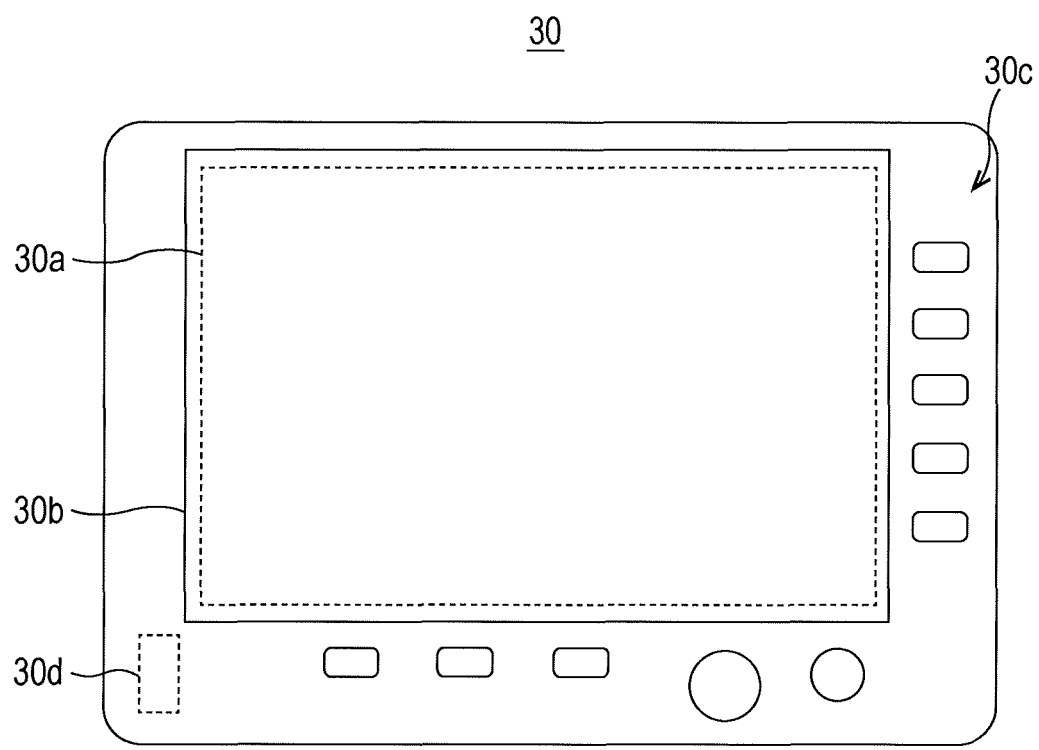
FIG. 5 is a diagram showing an exemplary hardware configuration of a touch panel display.
Figure 6:
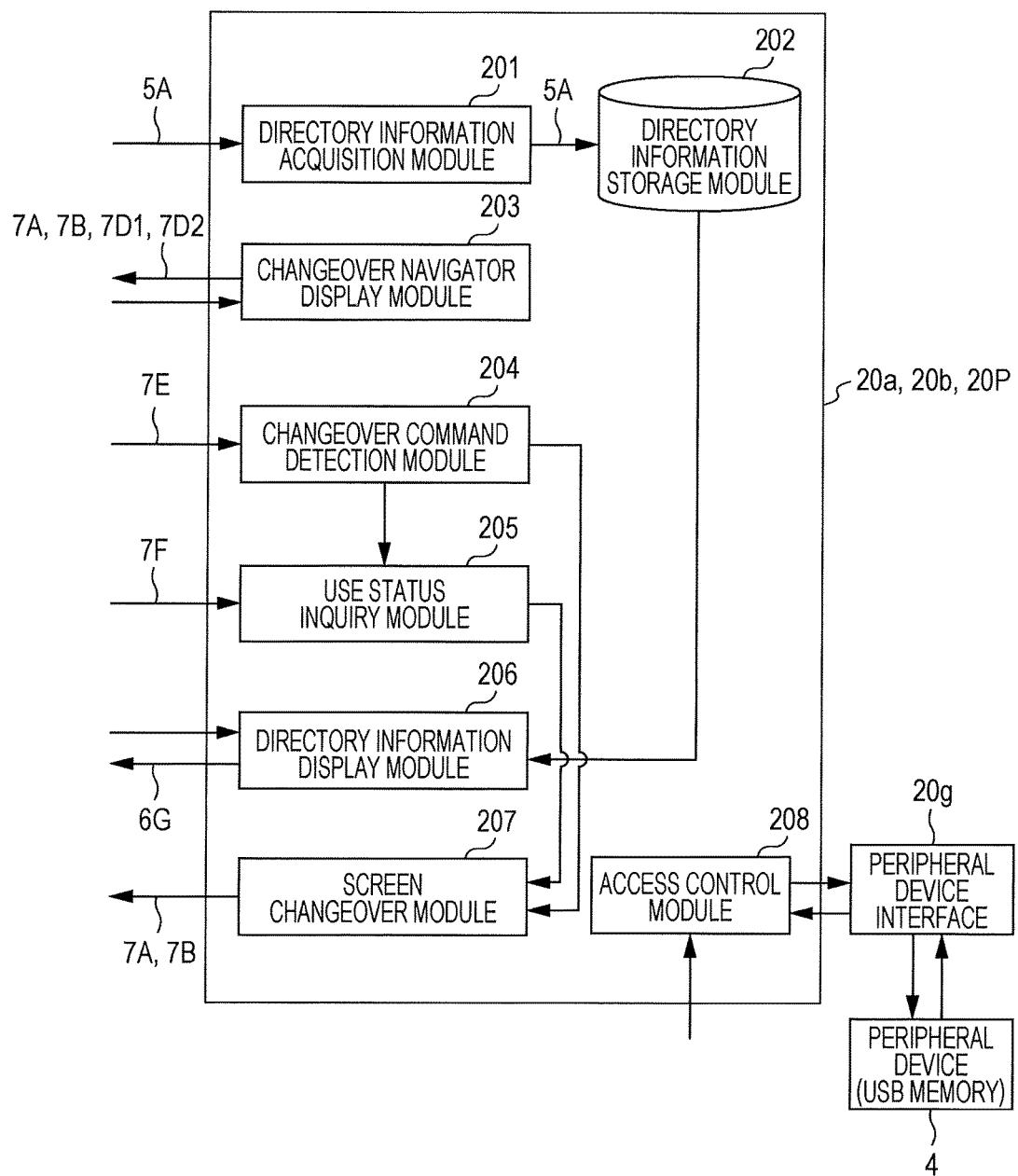
FIG. 6 is a diagram showing an exemplary functional configuration of the server unit.

FIG. 1 is a diagram showing an exemplary appearance of an image forming apparatus 1 according to an embodiment. FIG. 2 is a diagram showing an exemplary general configuration of the image forming apparatus 1. FIG. 3 is a diagram showing an exemplary hardware configuration of an MFP unit 10. FIG. 4 is a diagram showing an exemplary hardware configuration of a server unit 20. FIG. 5 is a diagram showing an exemplary hardware configuration of a touch panel display 30. FIG. 6 is a diagram showing an exemplary functional configuration of the server unit 20.

The image forming apparatus 1 integrates in a single apparatus various functions such as copy, PC print, fax, scan, and box. The image forming apparatus 1 may be commonly referred to as a multi function peripheral (MFP).

The PC print function prints an image on a sheet on the basis of image data received from a personal computer, a tablet computer, or a terminal device such as a smartphone. The PC print function may be referred to as a "network printing" or "network print" function.

The box function assigns for each user a storage space that may be called a "box" or a "personal box" to thereby enable the user to save and manage, for example, image data using his or her storage space. The box corresponds in personal computers to a "folder" or a "directory".

The image forming apparatus 1 further has a server function. The server function allows a web page to be downloaded from a website of the Internet, data to be uploaded to a website, and a document to be opened via an application.

As illustrated in FIG. 2, the image forming apparatus 1 includes the MFP unit 10, the server unit 20, and the touch panel display 30. The MFP unit 10, the server unit 20, and the touch panel display 30 are built or mounted in a single housing. Specifically, the MFP unit 10, the server unit 20, and the touch panel display 30 are integrated with each other.

The MFP unit 10 has various functions including copy, PC print, fax, scanner, and box. The server unit 20 has a server function.

The touch panel display 30 displays various types of screens, including a screen displaying a message for the user, a screen on which the user can input a command or information, a screen displaying results of processing performed by the MFP unit 10, and a screen displaying results of processing performed by the server unit 20. Additionally, the touch panel display 30 transmits data that indicates a position touched thereon to the server unit 20.

The touch panel display 30 includes as a communication interface an interface compatible with bi-directional communication.

As illustrated in FIG. 3, the MFP unit 10 includes a central processing unit (CPU) 10a, random access memory (RAM) 10b, read only memory (ROM) 10c, an auxiliary storage unit 10d, an external network interface card (NIC) 10e, a modem 10f, an internal NIC 10g, a peripheral device interface 10h, a scan unit 10i, an input image processing unit 10j, an output image processing unit 10k, and a print unit 10m.

The external NIC 10e communicates with an external device (e.g., terminal device) through a protocol, such as Transmission Control Protocol/Internet Protocol (TCP/IP).

The modem 10f exchanges image data with a facsimile device through a protocol such as G3.

The internal NIC 10g communicates with the server unit 20 (specifically, an external NIC 20e to be described later) using TCP/IP or other protocol. In the embodiment, the internal NIC 10g is used particularly for transmitting screen data to the server unit 20.

It is noted that a single NIC having a plurality of ports may be used commonly as the external NIC 10e and the internal NIC 10g.

The peripheral device interface 10h communicates with a peripheral device. In the embodiment, the peripheral device interface 10h particularly communicates with a peripheral device disposed in the server unit 20 (specifically, a peripheral device interface 20g to be described later) via the server unit 20 (specifically, a transfer interface 20h to be described later). The following illustrates a case in which a universal serial bus (USB) board is used as the peripheral device interface 10h.

The scan unit 10i scans an image recorded on a sheet placed on a platen glass to thereby generate image data.

The input image processing unit 10j performs various types of processing for image data acquired by the external NIC 10e, the modem 10f, or the scan unit 10i on the basis of a predetermined condition or a condition specified by the user.

The output image processing unit 10k performs various types of processing for image data of an image to be printed on the basis of a predetermined condition or a condition specified by the user.

The print unit 10m prints an image on a sheet on the basis of image data that has been subjected to image processing performed by the output image processing unit 10k.

The ROM 10c or the auxiliary storage unit 10d stores various types of programs and applications for achieving each of the abovementioned functions.

Such a program is loaded onto the RAM 10b and executed by the CPU 10a as necessary. A hard disk, a solid state drive (SSD), or the like is used as the auxiliary storage unit 10d.

As illustrated in FIG. 4, the server unit 20 includes a CPU 20a, RAM 20b, ROM 20c, an auxiliary storage unit 20d, the external NIC 20e, an internal NIC 20f, the peripheral device interface 20g, the transfer interface 20h, and a video board 20i. The server unit 20 has a hardware configuration basically identical to a hardware configuration of a desktop personal computer.

The external NIC 20e communicates with an external device (e.g., a web server or a cloud server) through a protocol, such as TCP/IP.

The internal NIC 20f is connected with the internal NIC 10g of the MFP unit 10 and communicates with the internal NIC 10g through a protocol such as TCP/IP. In the embodiment, the internal NIC 20f is used particularly for receiving screen data from the MFP unit 10.

It is noted that a single NIC having a plurality of ports may be used commonly as the external NIC 20e and the internal NIC 20f.

The peripheral device interface 20g is used to communicate with a peripheral device such as a removable disk, a keyboard, a mouse, a card reader/writer, or a fingerprint reader. The following illustrates a case in which a USB board is used as the peripheral device interface 20g.

The transfer interface 20h is used to communicate with the peripheral device interface 10h of the MFP unit 10. In the embodiment, a USB board is used as the peripheral device interface 10h as described previously. Thus, similarly, a USB board is used as the transfer interface 20h.

It is noted that a single USB board having a plurality of ports may be used commonly as the peripheral device interface 20g and the transfer interface 20h.

The video board 20i generates rasterized data of a screen to be displayed and transmits the rasterized data to the touch panel display 30. The video board 20i also receives data that indicates a position touched on the touch panel display 30 from the touch panel display 30. The video board 20i may be referred to also as a "graphic board" or a "video card". As with the touch panel display 30, the video board 20i supports bi-directional communication.

The following describes a case in which High-Definition Multimedia Interface (HDMI) is used as a communication method employed between the video board 20i and the touch panel display 30 (specifically, a video signal interface 30d to be described later). "HDMI" is a registered trademark.

The ROM 20c or the auxiliary storage unit 20d stores programs for achieving, for example, server functions, in addition to an operating system. The ROM 20c or the auxiliary storage unit 20d further stores a peripheral device manager 20P. The peripheral device manager 20P is a program that allows the touch panel display 30 and a peripheral device to be shared with the MFP unit 10.

The foregoing programs are loaded onto the RAM 20b and executed by the CPU 20a as necessary. A hard disk, an SSD, or the like is used as the auxiliary storage unit 20d.

As illustrated in FIG. 5, the touch panel display 30 includes a display 30a, a touch panel 30b, an operating key group 30c, and the video signal interface 30d.

The video signal interface 30d is connected with the video board 20i. The video signal interface 30d receives screen data from the server unit 20 and transmits to the server unit 20 data that indicates a position touched on the touch panel 30b or a key depressed on the operating key group 30c.

The display 30a displays various types of screens described previously on the basis of data received from the server unit 20.

The touch panel 30b detects a position touched thereon and transmits data indicating the position to the server unit 20.

The operating key group 30c is what is called a hardware keyboard. The operating key group 30c includes a start key, a stop key, and a function key.

As described previously, the peripheral device manager 20P allows the touch panel display 30 and a peripheral device to be shared between the MFP unit 10 and the server unit 20. The following describes a mechanism of the sharing for a specific case in which a USB memory 4 is mounted as the peripheral device in the server unit 20 and the MFP unit 10 and the server unit 20 shares the USB memory 4.

The peripheral device manager 20P enables achievement of functions including a directory information acquisition module 201, a directory information storage module 202, a changeover navigator display module 203, a changeover command detection module 204, a use status inquiry module 205, a directory information display module 206, a screen changeover module 207, and an access control module 208 shown in FIG. 6.

[Processing Upon Insertion of USB Memory 4]

Insertion of the USB memory 4 into a USB port in the peripheral device interface 20g at the server unit 20 causes the operating system to detect the USB memory 4. The detection results in the USB memory 4 being mounted in the operating system of the server unit 20.

When the USB memory 4 is mounted in the operating system, the directory information acquisition module 201 acquires from the USB memory 4 a list of directories provided in the USB memory 4 and a list of files stored in each of the directories as directory information 5A. The directory information may be acquired via the operating system.

The directory information storage module 202 stores the directory information 5A acquired by the directory information acquisition module 201.

[Processing for Display of Screens]

Figure 7:
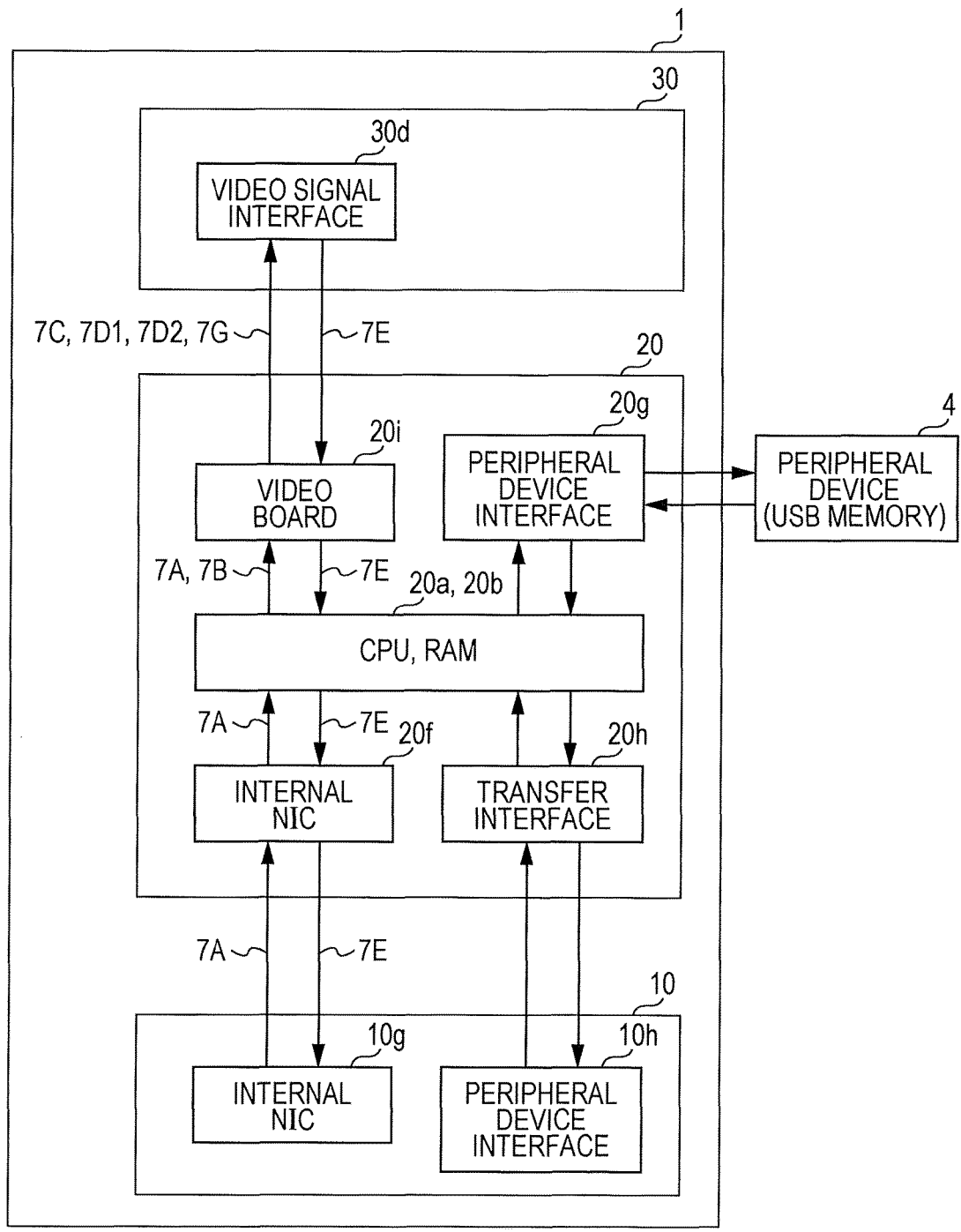
FIG. 7 is a diagram showing exemplary exchange of data among the MFP unit, the server unit, and the touch panel display.
Figure 8:
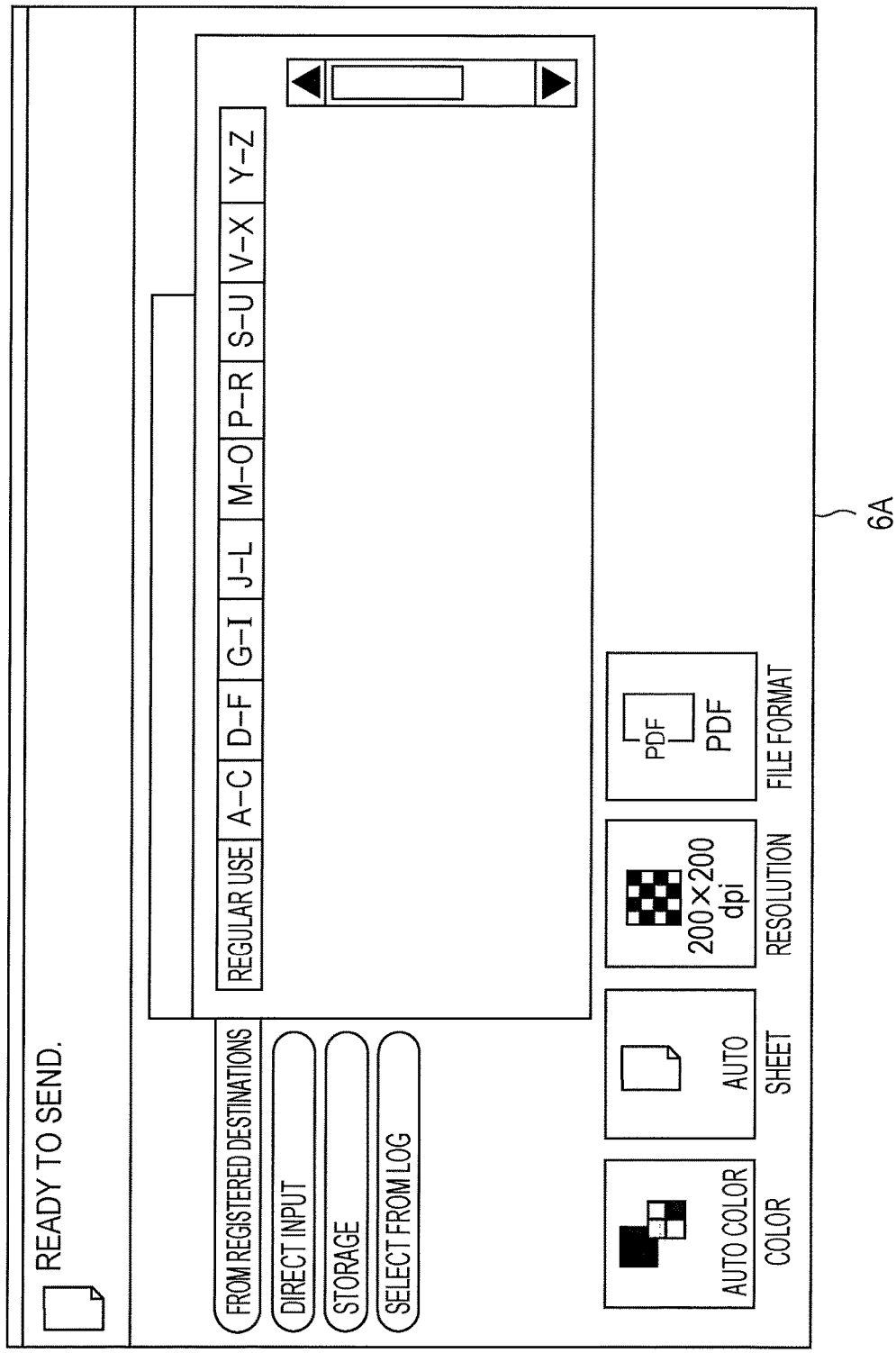
FIG. 8 is a diagram showing an exemplary scan job screen.
Figure 9:
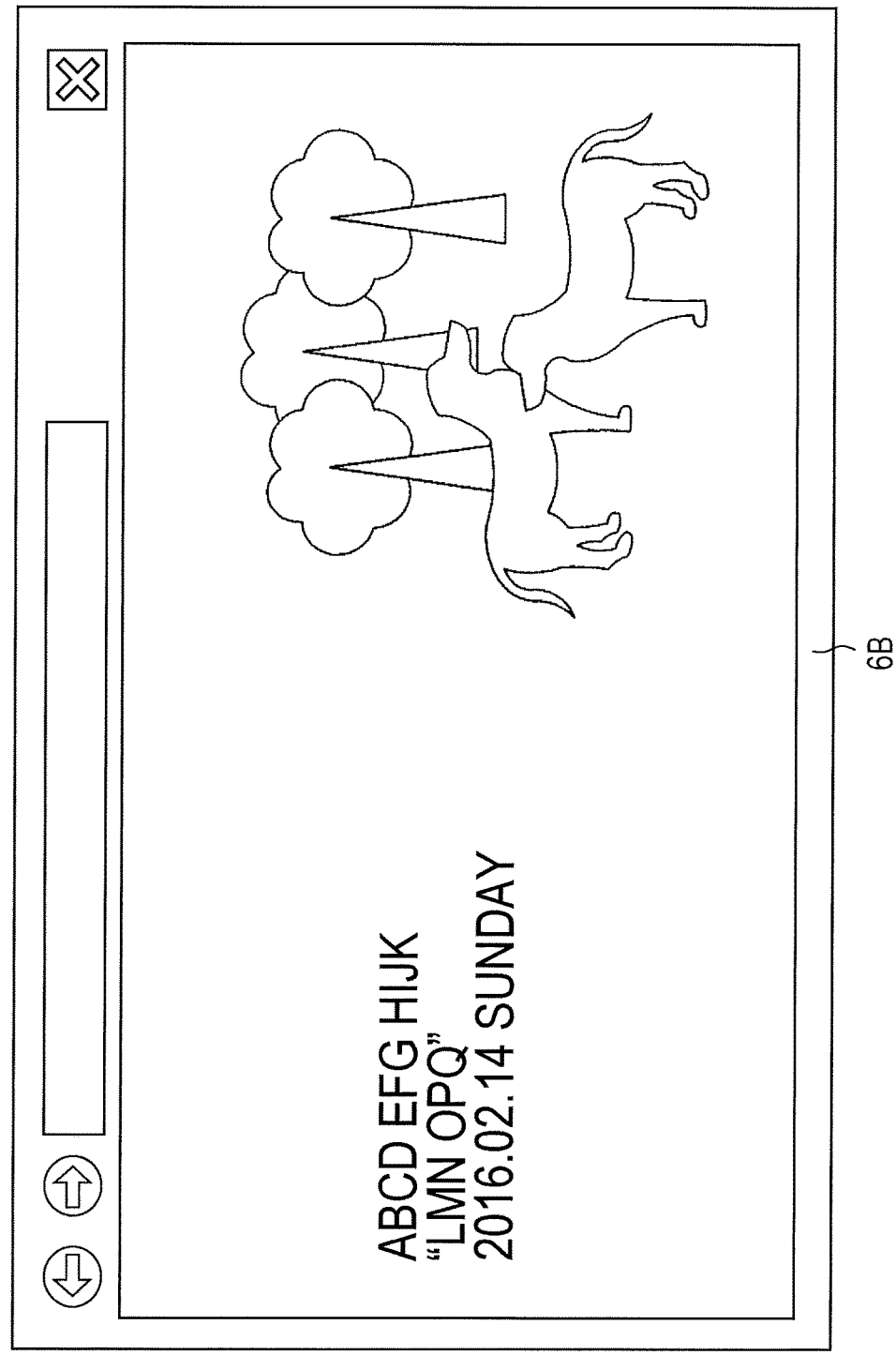
FIG. 9 is a diagram showing an exemplary browsing screen.
Figure 10:
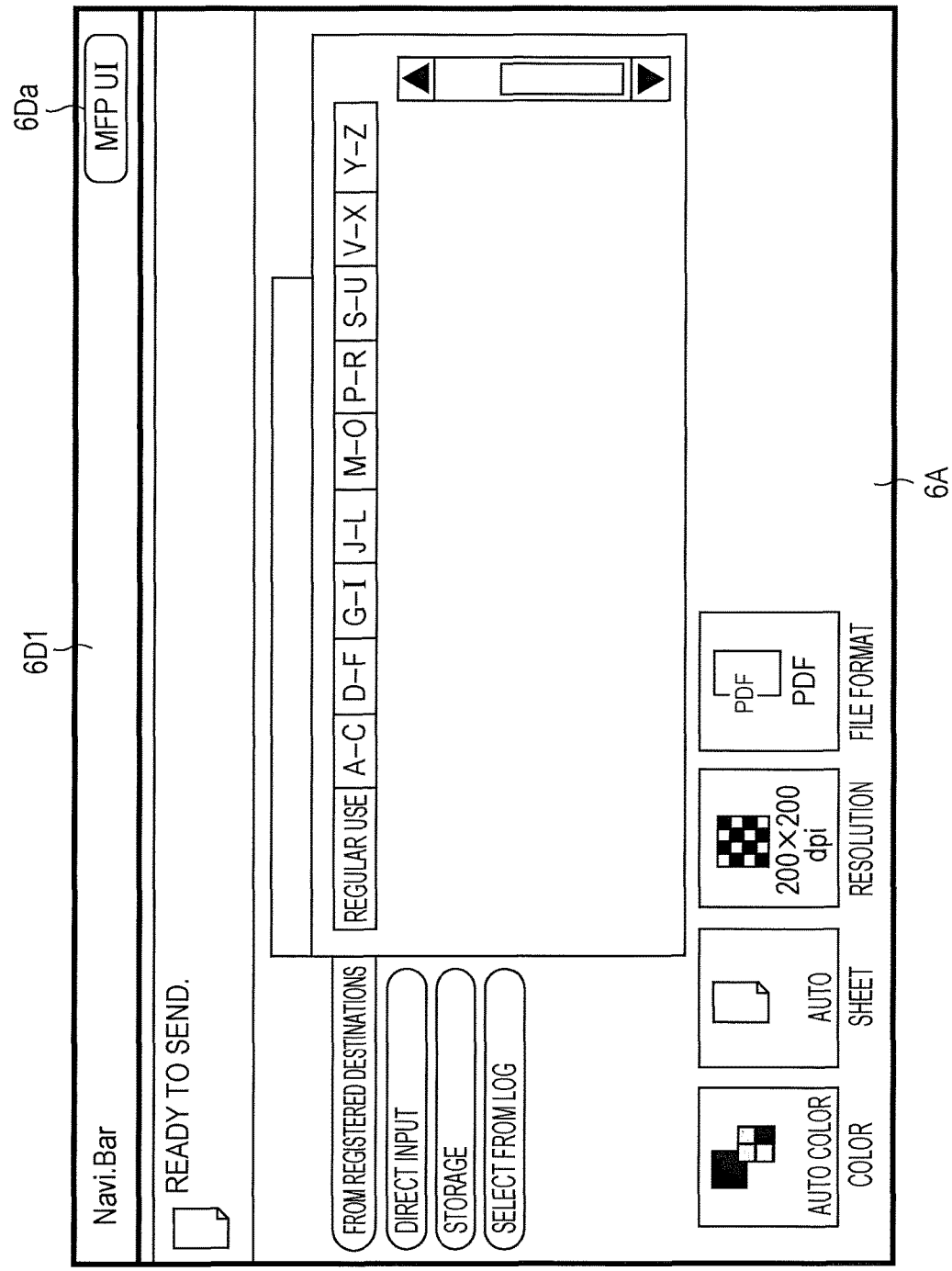
FIG. 10 is a diagram showing an exemplary display of a changeover navigation screen and the scan job screen.
Figure 11:
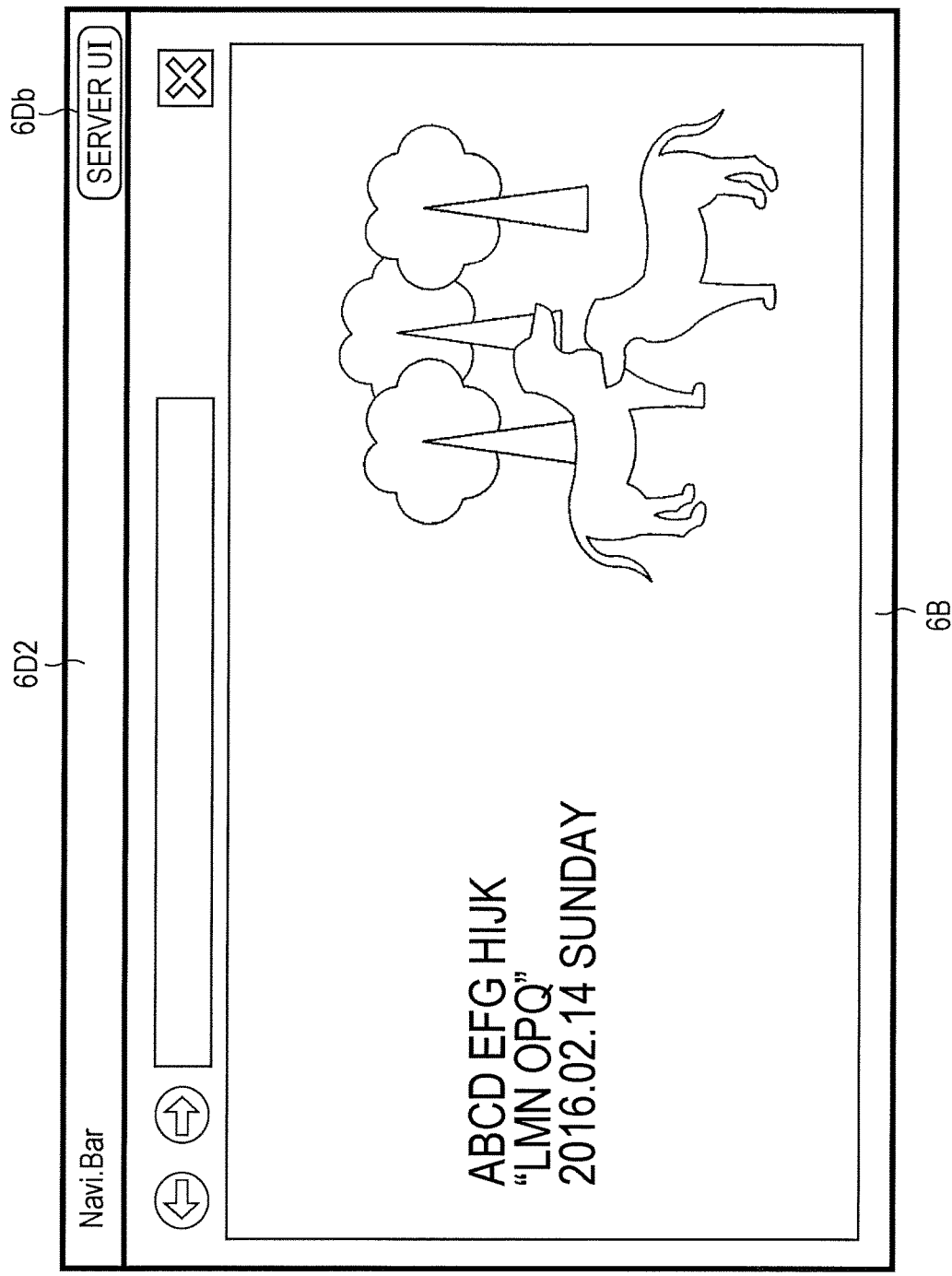
FIG. 11 is a diagram showing an exemplary display of a changeover navigation screen and the browsing screen.
Figure 12:
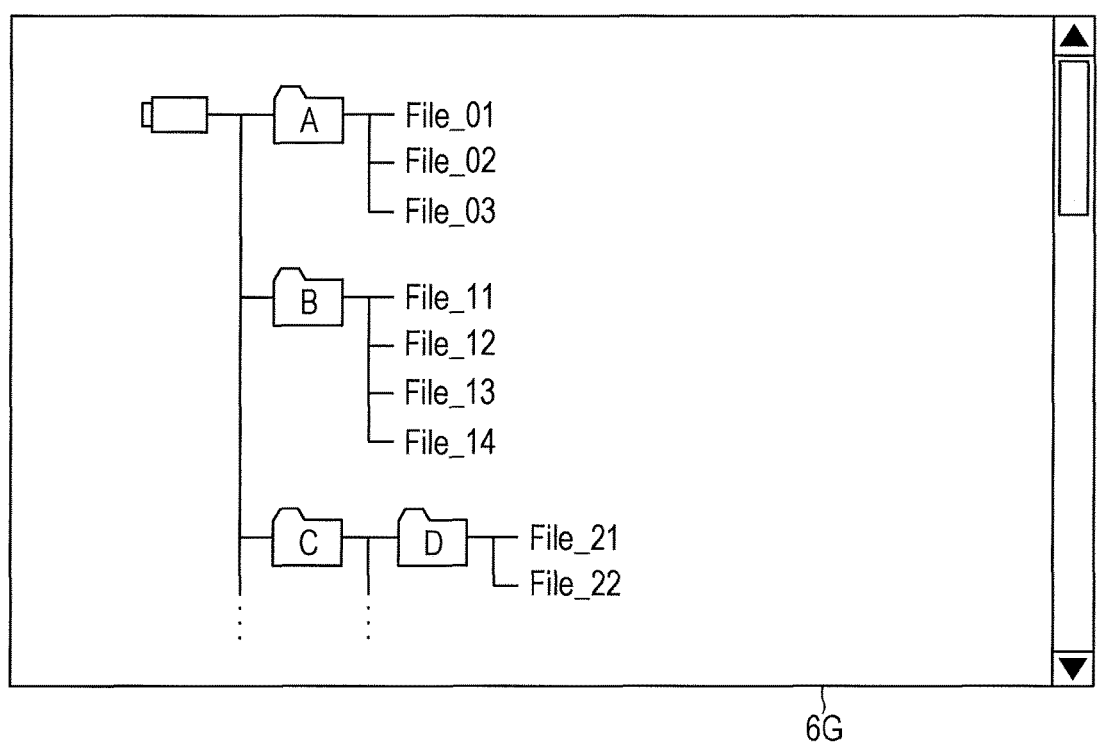
FIG. 12 is a diagram showing an exemplary directory screen.

FIG. 7 is a diagram showing exemplary exchange of data among the MFP unit 10, the server unit 20, and the touch panel display 30. FIG. 8 is a diagram showing an exemplary scan job screen 6A. FIG. 9 is a diagram showing an exemplary browsing screen 6B. FIG. 10 is a diagram showing an exemplary display of a changeover navigation screen 6D1 and the scan job screen 6A. FIG. 11 is a diagram showing an exemplary display of a changeover navigation screen 6D2 and the browsing screen 6B. FIG. 12 is a diagram showing an exemplary directory screen 6G.

The MFP unit 10 and the server unit 20 each basically perform processing independently of each other. The following illustrates a case in which the MFP unit 10 executes an application for a job that causes the MFP unit 10 to read an image from a sheet and to save the image in the USB memory and the server unit 20 executes a web browser. The job will be described as a "Scan_To_USB job" and the application will be described as a "scan application".

In the MFP unit 10, the scan application generates screen data 7A for displaying the scan job screen 6A and, as shown in FIG. 7, the screen data 7A is transmitted from the internal NIC 10g of the MFP unit 10 to the internal NIC 20f of the server unit 20. The scan job screen 6A allows, for example, scan conditions to be specified, as shown in FIG. 8. Conditions for the Scan_To_USB job can also be specified on the scan job screen 6A.

In the server unit 20, the web browser generates screen data 7B for displaying the browsing screen 6B. The browsing screen 6B displays a web page as shown in FIG. 9.

As such, the server unit 20 can obtain either one or both of the screen data 7A and the screen data 7B that represent data of the scan job screen 6A and the browsing screen 6B, respectively.

The video board 20i rasterizes either one of the screen data 7A and the screen data 7B to thereby generate video data 7C of red, green, and blue (RGB) and transmits the video data 7C to the video signal interface 30d of the touch panel display 30. It is noted that which one of the screen data 7A and the screen data 7B is to be rasterized is determined in advance. For example, the screen data 7A or the screen data 7B, whichever has been generated first, is to be rasterized.

When the video signal interface 30d acquires the video data 7C in the touch panel display 30, the display 30a displays the scan job screen 6A or the browsing screen 6B using the video data 7C. It is noted that, as will be described later, the user can change screens to be displayed on the display 30a as appropriate.

Of the foregoing screens, a screen that is currently displayed by video signal interface 30d will hereinafter be referred to as a "current screen". It is noted that, when both the screen data 7A and the screen data 7B have been obtained, the server unit 20 transmits to the touch panel display 30 video data 7D1 or 7D2 to be described later in place of the video data 7C.

The changeover navigator display module 203, the changeover command detection module 204, and the screen changeover module 207 change the screens to be displayed on the display 30a as follows.

Specifically, when both the screen data for the screen of the MFP unit 10 (in the present example, the screen data 7A) and the screen data for the screen of the server unit 20 (in the present example, the screen data 7B) have been obtained, the changeover navigator display module 203 displays a changeover navigation screen at an upper portion of the screen of the MFP unit 10 or the server unit 20.

Specifically, when the current screen is the scan job screen 6A, the changeover navigator display module 203 disposes the changeover navigation screen 6D1 at the upper portion of the scan job screen 6A as shown in FIG. 10. The video board 20i is then caused to rasterize image data of the image of the foregoing state and video data 7D1 is thereby generated. The video data 7D1 is then transmitted from the video board 20i to the touch panel display 30.

The changeover navigation screen 6D1 includes a changeover button 6Da disposed thereon. The changeover button 6Da generates a command to switch the current screen to the screen of the server unit 20 (in the present example, the browsing screen 6B).

When the current screen is the browsing screen 6B, the changeover navigator display module 203 disposes the changeover navigation screen 6D2 at the upper portion of the browsing screen 6B as shown in FIG. 11. The video board 20i is then caused to rasterize image data of the image of the foregoing state and video data 7D2 is thereby generated. The video data 7D2 is then transmitted from the video board 20i to the touch panel display 30.

The changeover navigation screen 6D2 includes a changeover button 6Db disposed thereon. The changeover button 6Db generates a command to switch the current screen to the screen of the MFP unit 10 (in the present example, the scan job screen 6A).

When the video signal interface 30d acquires the video data 7D1 in the touch panel display 30, the display 30a displays the scan job screen 6A and the changeover navigation screen 6D1 using the video data 7D1 (see FIG. 10). When the video signal interface 30d acquires the video data 7D2, the display 30a displays the browsing screen 6B and the changeover navigation screen 6D2 using the video data 7D2 (see FIG. 11).

The touch panel 30b, when touched by the user, transmits touch position data 7E that indicates the position touched by the user to the server unit 20 via the video signal interface 30d.

In the server unit 20, when the video board 20i receives the touch position data 7E from the touch panel display 30 and when a position indicated by the touch position data 7E (hereinafter referred to as a "touch position") is the position of the changeover button 6Da or the changeover button 6Db, the changeover command detection module 204 detects a changeover command.

When the touch position is any position other than the position of the changeover button 6Da or the changeover button 6Db (e.g., a position of an object disposed in the scan job screen 6A or the browsing screen 6B), ordinary processing is performed.

Specifically, when the touch position is the position of an object disposed in the browsing screen 6B, the touch position data 7E is passed onto the web browser. The web browser then performs processing corresponding to the object (e.g., moving to a web page).

Alternatively, when the touch position is the position of an object disposed in the scan job screen 6A, the touch position data 7E is transmitted to the MFP unit 10 via the internal NIC 20f. When the internal NIC 10g receives the touch position data 7E in the MFP unit 10, the scan application performs processing corresponding to the object (e.g., displaying an address book, or the Scan_To_USB job).

When, in the server unit 20, the changeover command detection module 204 detects the changeover command, processing to switch the current screen is performed by the screen changeover module 207 as follows.

When the current screen is the scan job screen 6A, the screen changeover module 207 causes the video board 20*i* to rasterize the screen data 7B in place of the screen data 7A to thereby generate the video data 7C and causes the video board 20*i* to transmit the video data 7C to the touch panel display 30. The foregoing step results in the browsing screen 6B being displayed on the display 30*a*. Specifically, the current screen is switched from the scan job screen 6A to the browsing screen 6B.

When the current screen is the browsing screen 6B, the screen changeover module 207 causes the video board 20*i* to rasterize the screen data 7A in place of the screen data 7B to thereby generate the video data 7C and causes the video board 20*i* to transmit the video data 7C to the touch panel display 30. The foregoing step results in the scan job screen 6A being displayed on the display 30*a*. Specifically, the current screen is switched from the browsing screen 6B to the scan job screen 6A.

The changeover navigator display module 203 performs the foregoing processing so that the changeover navigation screen 6D1 or the changeover navigation screen 6D2 appears at the upper portion of the new current screen.

The foregoing processing performed by the screen changeover module 207 and the changeover navigator display module 203 switches the screen displayed on the display 30*a* from the state shown in FIG. 10 to the state shown in FIG. 11, or vice versa.

When the USB memory 4 is inserted in the peripheral device interface 20*g*, however, the current screen may not be switched immediately. The following describes processing to be performed when the USB memory 4 is inserted in the peripheral device interface 20*g*.

When the changeover command detection module 204 detects a changeover command, the use status inquiry module 205 inquires of the operating system of the server unit 20 about a current use status of the USB memory 4. The use status inquiry module 205 thereby acquires status data 7F that indicates the current use status from the operating system.

The status data 7F indicates either one of "in use" and "idling". The status "in use" indicates that data is being exchanged between the USB memory 4 and the peripheral device interface 20*g* or that a file stored in the USB memory 4 is being used.

The status "idling" indicates that neither data is being exchanged nor files are being used. Specifically, the status "idling" indicates that the USB memory 4 can immediately be removed from the peripheral device interface 20*g*.

When the status data 7F indicates "idling", the screen changeover module 207 immediately performs the processing to switch the current screen through the procedure described above. In addition, the changeover navigator display module 203 performs the processing to display the changeover navigation screen 6D1 or the changeover navigation screen 6D2 through the procedure described above.

When the status data 7F indicates "in use", the use status inquiry module 205 inquires of the operating system, at regular intervals (e.g., every 1 sec. to several sec.), about the current use status of the USB memory 4 to thereby acquire the status data 7F. This inquiry allows the current status of the USB memory 4 to be monitored.

When the status of the USB memory 4 remains "in use" and a predetermined command is input by the user, the directory information display module 206 reads the directory information 5A from the directory information storage module 202. The directory information display module 206 displays the directory information 5A in place of the current screen on the display 30*a*.

The directory information display module 206 generates image data of the directory screen 6G as shown in FIG. 12 using the directory information 5A. The directory screen 6G is an image representing a tree structure of the directories.

The directory information display module 206 causes the video board 20*i* to rasterize the image data to thereby generate video data 7G and causes the video board 20*i* to transmit the video data 7G to the touch panel display 30.

Then in the touch panel display 30, the video signal interface 30*d* receives the video data 7G and, on the basis of the video data 7G, the touch panel 30*b* displays the directory screen 6G.

When the USB memory 4 enters the idling state, the screen changeover module 207 performs processing to switch the current screen and the changeover navigator display module 203 performs processing to display the changeover navigation screen 6D1 or the changeover navigation screen 6D2 through the foregoing procedure. The performance of the processing switches the screen displayed on the display 30*a* from the state shown in FIG. 10 to the state shown in FIG. 11, or vice versa.

[Control of Access to USB Memory 4]

As described above, the USB memory 4 is shared between the MFP unit 10 and the server unit 20.

When attempts are simultaneously made to use the USB memory 4 by the MFP unit 10 and the server unit 20, however, the MFP unit 10 and the server unit 20 may each undesirably issue a command to perform conflicting processing.

Thus, the access control module 208 controls, for example, the USB memory 4 and the peripheral device interface 10*h* as follows so that either one of the MFP unit 10 and the server unit 20 is selected and entitled to use the USB memory 4.

When the current screen is the screen of the server unit 20 (in the present example, the browsing screen 6B), the access control module 208 controls, for example, the USB memory 4 and the peripheral device interface 10*h* so that the server unit 20 can use the USB memory 4.

Specifically, when an event requiring access to the USB memory 4 occurs in the server unit 20, the access control module 208 exchanges data with the USB memory 4 via the peripheral device interface 20*g*.

When, for example, the web browser performs an operation to save a file downloaded from a cloud server in the USB memory 4, the access control module 208 writes the file in the USB memory 4 via the peripheral device interface 20*g*.

When, for example, the web browser performs an operation to specify a file to be uploaded to the cloud server, the access control module 208 reads the file from the USB memory 4 via the peripheral device interface 20*g* and passes the file onto the web browser.

The access control module 208, however, rejects a request for access to the USB memory 4, received from the MFP unit 10 via the transfer interface 20*h*.

When the current screen is the screen of the MFP unit 10 (in the present example, the scan job screen 6A), the access control module 208 manages the USB memory 4 so that the MFP unit 10 can use the USB memory 4. At this time, the server unit 20 has a function as a client device.

Specifically, when an event requiring access to the USB memory 4 occurs in the MFP unit 10, a request for processing corresponding to the event (e.g., writing, viewing, deleting, moving, or updating a file; creating, viewing, or deleting a directory, or the like) is made to the server unit 20 via the peripheral device interface 10*h*.

When, in the server unit 20, the transfer interface 20*h* receives the request, the access control module 208 performs processing with respect to the USB memory 4 in accordance with the request.

When, for example, an operation is performed to save in the USB memory 4 the file of an image generated by the scan application, the scan unit 10*i,* and the like, a write request and the file are transmitted from the MFP unit 10 to the transfer interface 20*h* via the peripheral device interface 10*h*.

The access control module 208 then writes the file in the USB memory 4 via the peripheral device interface 20*g*.

When, for example, an operation is performed in the MFP unit 10 to specify the file of an image to be printed by a print application, the access control module 208 reads the file from the USB memory 4 via the peripheral device interface 20*g*. The transfer interface 20*h* then transfers the file to the MFP unit 10.

However, the access control module 208 does not access the USB memory 4 even when an event requiring access to the USB memory 4 occurs in an application of the server unit 20.

Figure 13:
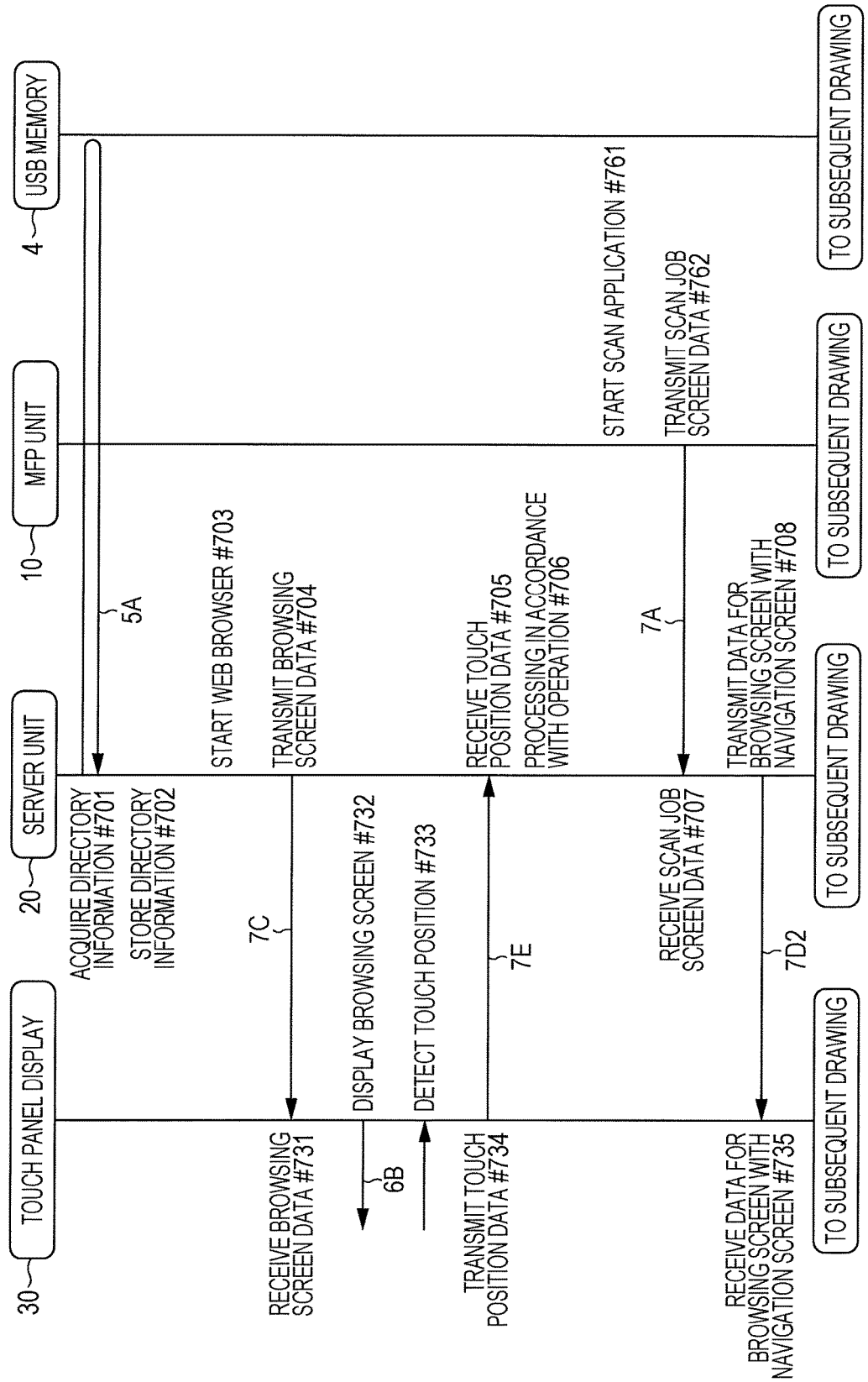
FIG. 13 is a sequence diagram illustrating exemplary steps performed by each unit in a specific example.
Figure 14:
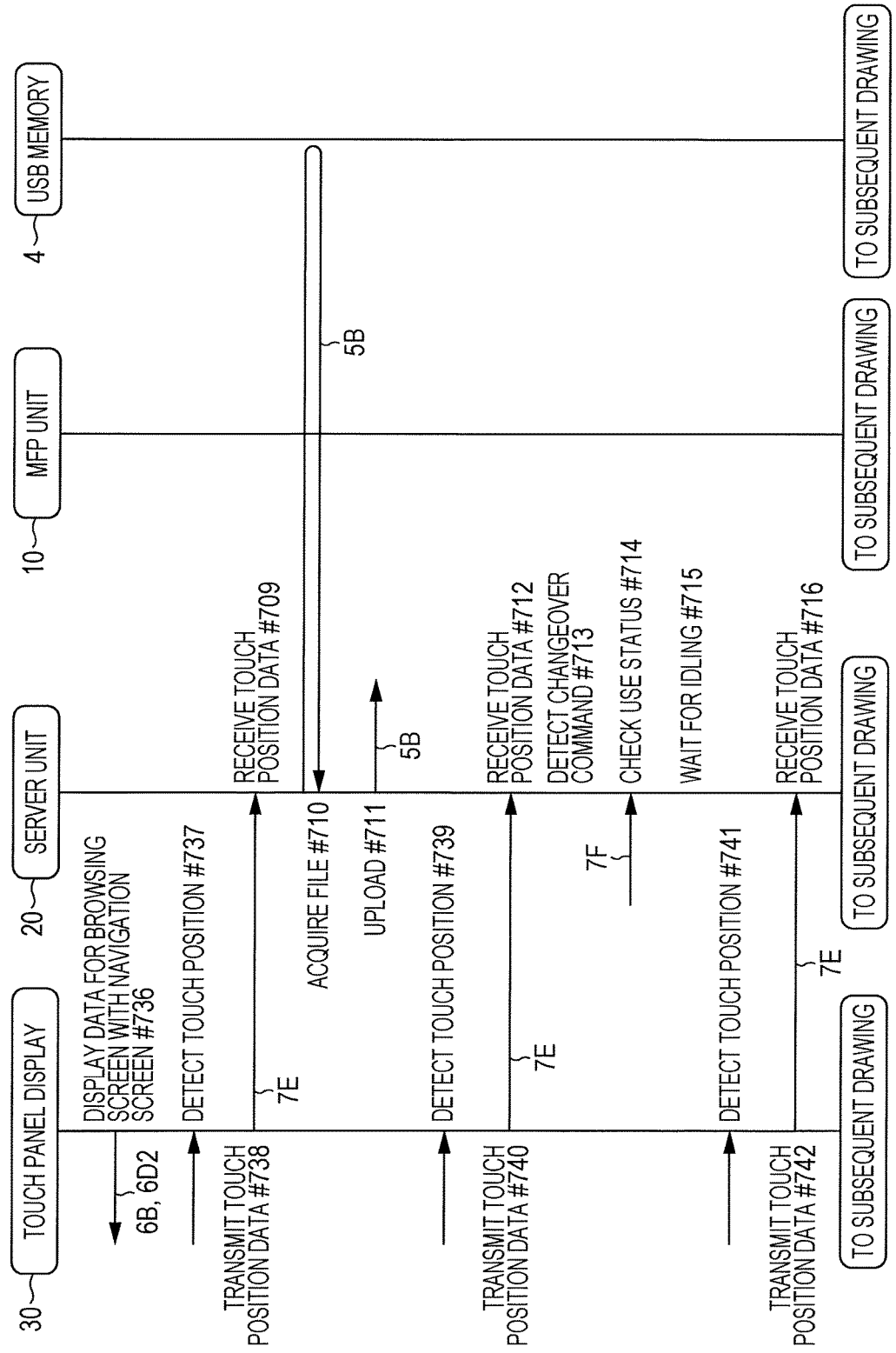
FIG. 14 is a sequence diagram illustrating exemplary steps performed by each unit in a specific example.
Figure 15:
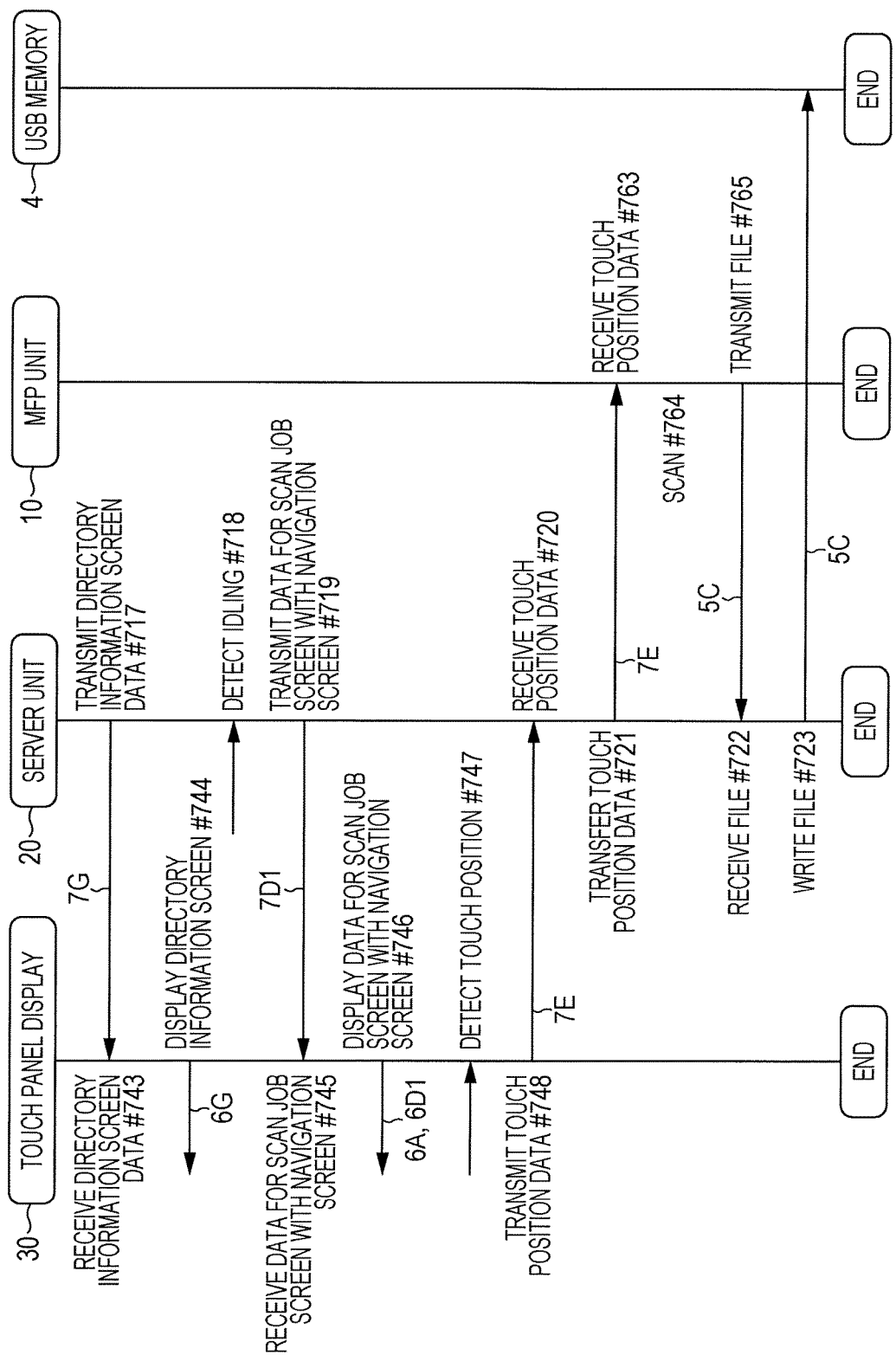
FIG. 15 is a sequence diagram illustrating exemplary steps performed by each unit in a specific example.

FIGS. 13 to 15 are sequence diagrams illustrating exemplary steps performed by each unit in a specific example.

The following describes, with reference to FIGS. 13 to 15, specific examples of processing performed by each of the MFP unit 10, the server unit 20, and the touch panel display 30 when the user accesses the USB memory 4 using each of the scan application and the web browser.

The user inserts the USB memory 4 into the port of the peripheral device interface 20*g*. The insertion causes the server unit 20 to acquire the directory information 5A from the USB memory 4 (#701 in FIG. 13) and to store the directory information 5A (#702 in FIG. 13).

The server unit 20 starts the web browser (#703 in FIG. 13) and then starts transmitting to the touch panel display 30 data for display of the browsing screen 6B (see FIG. 9) (#704 in FIG. 13). Specifically, the server unit 20 starts processing to generate the video data 7C by rasterizing the data of the browsing screen 6B, specifically, the screen data 7B and to transmit the video data 7C to the touch panel display 30.

The touch panel display 30 receives the video data 7C (#731 in FIG. 13) and displays the browsing screen 6B using the video data 7C (#732 in FIG. 13).

Each time the user touches the touch panel 30*b,* the touch panel display 30 detects the touch position (#733 in FIG. 13) and transmits, as the touch position data 7E, data that indicates the touch position to the server unit 20 (#734 in FIG. 13).

Each time the touch position data 7E is received (#705 in FIG. 13), the server unit 20 determines the object corresponding to the position indicated by the touch position data 7E (touch position) in the screen that is currently displayed on the touch panel display 30 and performs processing in accordance with the object (#706 in FIG. 13). When the current screen is the screen of the MFP unit 10 (in the present example, the scan job screen 6A) and includes the object corresponding to the touch position, the server unit 20 transmits the touch position data 7E to the MFP unit 10. The foregoing holds for subsequent steps in the sequence diagrams shown in FIGS. 13 to 15. At Step #706, when the object is a hyperlink, for example, the linked webpage is downloaded and displayed.

The MFP unit 10 starts the scan application (#761 in FIG. 13) and then starts transmitting to the server unit 20 data for display of the scan job screen 6A (see FIG. 8), specifically, the screen data 7A (#762 in FIG. 13).

The server unit 20 receives the screen data 7A (#707 in FIG. 13). The reception allows the server unit 20 to acquire data of both the scan job screen 6A and the browsing screen 6B.

Then, the server unit 20 generates data for an image that contains the changeover navigation screen 6D2 disposed above the browsing screen 6B as shown in FIG. 11. The server unit 20 rasterizes the data to thereby generate the video data 7D2 and transmits the video data 7D2 to the touch panel display 30 (#708 in FIG. 13).

The touch panel display 30, having received the video data 7D2 (#735 in FIG. 13), displays the browsing screen 6B and the changeover navigation screen 6D2 as shown in FIG. 11 using the video data 7D2 (#736 in FIG. 14).

The user performs an operation to upload a file 5B stored in the USB memory 4 to the cloud server.

Then, the touch panel display 30 detects the touch position (#737 in FIG. 14) and transmits, as the touch position data 7E, data that indicates the touch position to the server unit 20 (#738 in FIG. 14).

The server unit 20, having received the touch position data 7E (#709 in FIG. 14), determines processing to be performed on the basis of the touch position data 7E and performs the processing (#710 and #711 in FIG. 14). In this example, the server unit 20 reads the file in question from the USB memory 4 (#710 in FIG. 14) and uploads the file to the cloud server (#711 in FIG. 14).

To achieve the next purpose, the user attempts to switch to the scan job screen 6A by touching the changeover button 6Db in the changeover navigation screen 6D2.

Then, the touch panel display 30 detects the touch position (#739 in FIG. 14) and transmits, as the touch position data 7E, data that indicates the touch position to the server unit 20 (#740 in FIG. 14).

The server unit 20, having received the touch position data 7E (#712 in FIG. 14), detects a changeover command using the touch position data 7E (#713 in FIG. 14). The server unit 20 then starts checking the current use status of the USB memory 4 (#714 in FIG. 14). The foregoing step enables the status data 7F to be obtained regularly. If the USB memory 4 is in use, the server unit 20 waits until the USB memory 4 is idling (#715 in FIG. 14).

During the time until the USB memory 4 is idling, the user performs a predetermined operation for searching a file to be used for the next purpose.

The touch panel display 30 then detects the touch position (#741 in FIG. 14) and transmits, as the touch position data 7E, data that indicates the touch position to the server unit 20 (#742 in FIG. 14).

It is noted that any specific function key of the operating key group 30*c* may be depressed. In this case, data indicating that specific function key, instead of the touch position data 7E, is transmitted from the touch panel display 30 to the server unit 20.

The server unit 20, having received the touch position data 7E or the data indicating the specific function key (#716 in FIG. 14), generates the video data 7G on the basis of the directory information 5A stored at Step #702 and transmits the video data 7G to the touch panel display 30 (#717 in FIG. 15).

The touch panel display 30, having received the video data 7G (#743 in FIG. 15), displays the directory screen 6G (see FIG. 12) on the basis of the video data 7G (#744 in FIG. 15).

The server unit 20, having detected that the USB memory 4 is idling (#718 in FIG. 15), generates data for an image that contains the changeover navigation screen 6D1 disposed above the scan job screen 6A as shown in FIG. 10. The server unit 20 rasterizes the data to thereby generate the video data 7D1 and transmits the video data 7D1 to the touch panel display 30 (#719 in FIG. 15).

The touch panel display 30, having received the video data 7D1 (#745 in FIG. 15), displays the scan job screen 6A and the changeover navigation screen 6D1 as shown in FIG. 10 using the video data 7D1 (#746 in FIG. 15).

The user here performs an operation to scan an image from a sheet and store the image data in the USB memory 4.

The touch panel display 30 then detects the touch position (#747 in FIG. 15) and transmits data indicating the touch position as the touch position data 7E to the server unit 20 (#748 in FIG. 15).

The server unit 20 receives the touch position data 7E (#72 0 in FIG. 15). Because the object corresponding to the touch position is included in the current screen, the server unit 20 transfers the touch position data 7E to the MFP unit 10 (#721 in FIG. 15).

The MFP unit 10, having received the touch position data 7E (#7 63 in FIG. 15), determines the object corresponding to the touch position in the scan job screen 6A and performs processing in accordance with the object (#764 and #765 in FIG. 15). Specifically, in the present example, the MFP unit 10 reads an image from a sheet to thereby generate a file 5C (#764 in FIG. 15) and transmits to the server unit 20 the file 5C together with a command to write the file 5C in the USB memory 4 (#765 in FIG. 15).

The server unit 20, having received the command and the file 5C (#722 in FIG. 15), writes the file 5C in the USB memory 4 in accordance with the command (#723 in FIG. 15).

Figure 16:
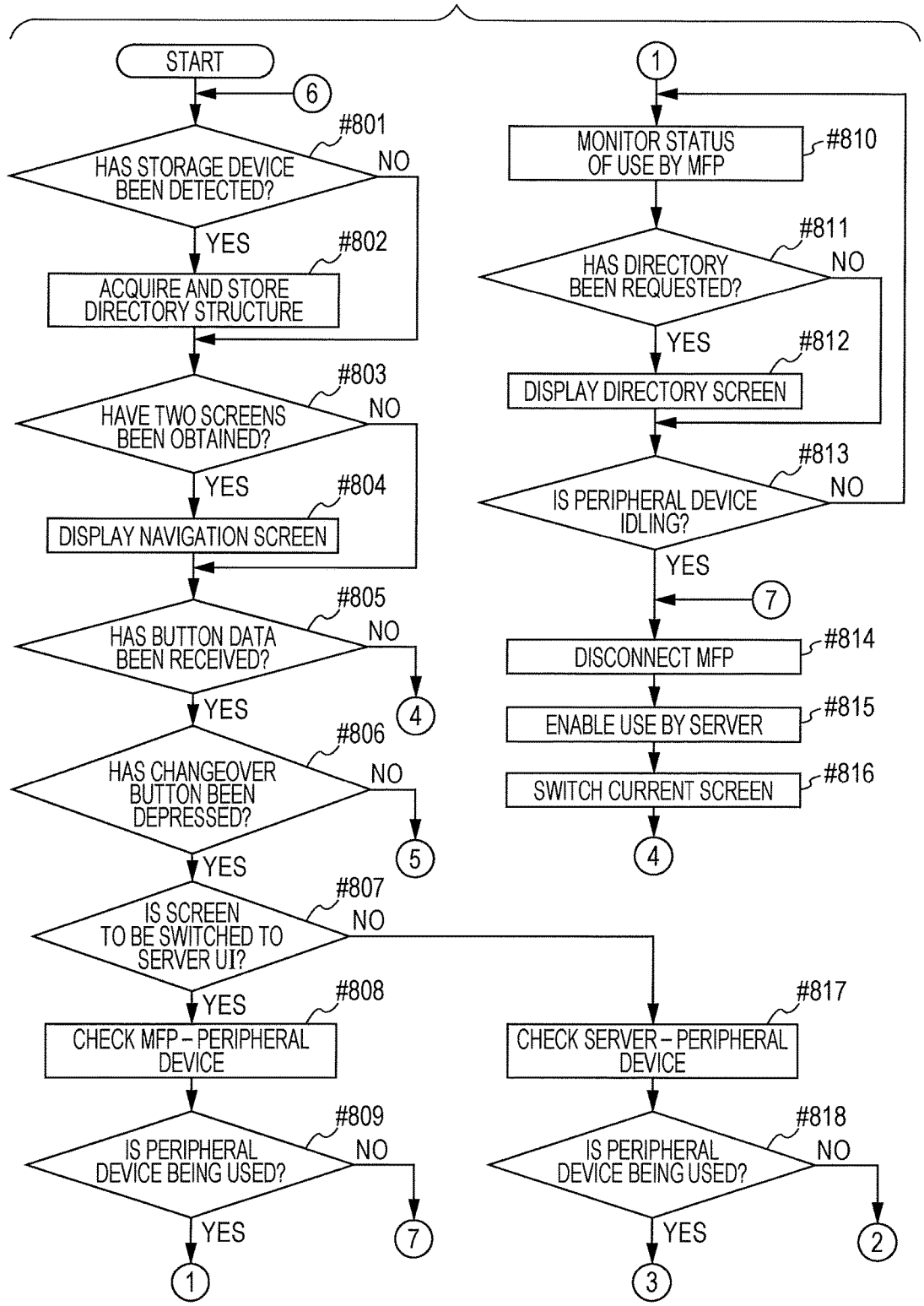
FIG. 16 is a flowchart illustrating exemplary general processing performed by a peripheral device manager.
Figure 17:
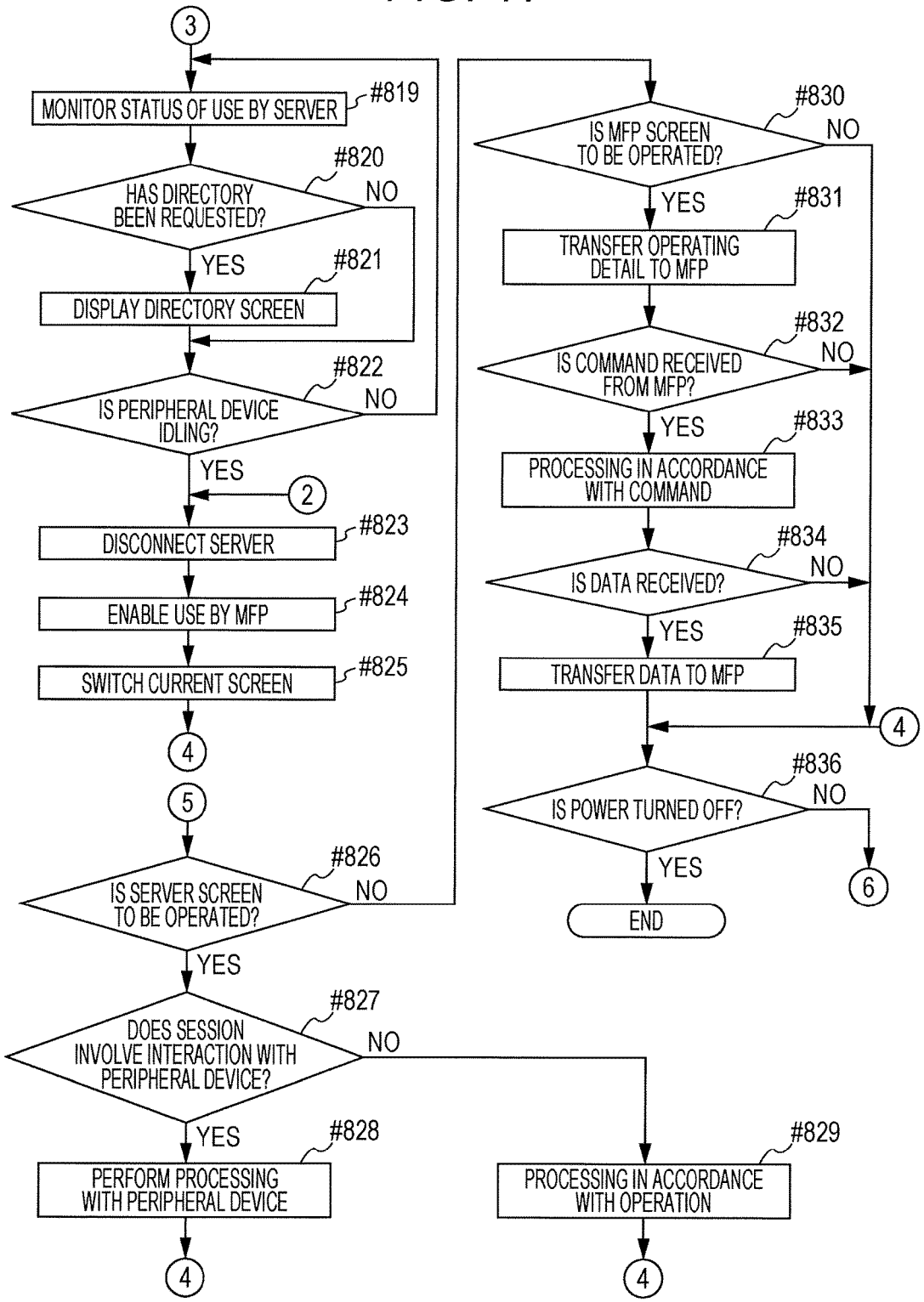
FIG. 17 is a flowchart illustrating the exemplary general processing performed by the peripheral device manager.

FIGS. 16 and 17 are a flowchart illustrating exemplary general processing performed by the peripheral device manager 20P.

The following describes, with reference to the flowchart shown in FIGS. 16 and 17, the general processing relating to display of screens and access to the USB memory 4, performed in the server unit 20.

The server unit 20 performs the steps shown in FIGS. 16 to 17 in accordance with the peripheral device manager 20P.

Upon occurrence of an event, the server unit 20 performs processing in accordance with the event.

The server unit 20, having detected that a peripheral device that is a storage device (e.g., the USB memory 4) is mounted (#801 in FIG. 16), acquires the directory information 5A from the peripheral device and stores the directory information 5A (#802 in FIG. 16).

Alternatively, when having acquired both screen data of the server unit 20 and screen data of the MFP unit 10 (YES at #803 in FIG. 16), the server unit 20 displays the changeover navigation screen 6D1 or the changeover navigation screen 6D2 together with the current screen on the touch panel display 30 as shown in FIG. 10 or 11 (#804 in FIG. 16).

Alternatively, when having received the touch position data 7E from the touch panel display 30 (YES at #805 in FIG. 16), the server unit 20 performs processing as follows in accordance with the object corresponding to the touch position.

If the object is the changeover button 6Da, specifically, the object for switching to the screen of the server unit 20 (YES at #806 and #807 in FIG. 16), the server unit 20 performs processing as follows.

The server unit 20 checks the use status of the peripheral device (#808 in FIG. 16). If the peripheral device is being used (YES at #809 in FIG. 16), the server unit 20 starts monitoring the use status of the peripheral device (#810 in FIG. 16). If an operation is performed to request the directory information 5A before the peripheral device is idling (YES at #811 in FIG. 16), the server unit 20 displays the directory screen 6G on the touch panel display 30 (#812 in FIG. 16).

If the peripheral device is idling (YES at #813 in FIG. 16), the server unit 20 prohibits use by the MFP unit 10 (#814 in FIG. 16) and permits use by the application of the server unit 20 (#815 in FIG. 16). Then, as shown in FIG. 11, the current screen is switched to the screen of the server unit 20 and the changeover navigation screen 6D2 is displayed (#816 in FIG. 16). Even if the peripheral device is not being used (NO at #809 in FIG. 16), the server unit 20 performs similar processing (#814 to #816 in FIG. 16).

If the object corresponding to the touch position is the changeover button 6Db, specifically, the object for switching to the screen of the MFP unit 10 (YES at #806 and NO at #807 in FIG. 16), the server unit 20 performs processing as follows.

The server unit 20 checks the use status of the peripheral device (#817 in FIG. 16). If the peripheral device is being used (YES at #818 in FIG. 16), the server unit 20 starts monitoring the use status of the peripheral device (#819 in FIG. 17). If an operation is performed to request the directory information 5A before the peripheral device is idling (YES at #820 in FIG. 17), the server unit 20 displays the directory screen 6G on the touch panel display 30 (#821 in FIG. 17).

If the peripheral device is idling (YES at #822 in FIG. 17), the server unit 20 prohibits use by the application of the server unit 20 (#823 in FIG. 17) and permits use by the MFP unit 10 (#824 in FIG. 17). Then, as shown in FIG. 10, the current screen is switched to the screen of the MFP unit 10 and the changeover navigation screen 6D1 is displayed (#825 in FIG. 17). Even if the peripheral device is not being used (NO at #818 in FIG. 16), the server unit 20 performs similar processing (#823 to #825 in FIG. 17).

If the object corresponding to the touch position pertains to the screen of the server unit 20 (NO at #806 in FIG. 16 and YES at #826 in FIG. 17) and if the object corresponds to processing involving interaction with the peripheral device (YES at #827 in FIG. 17), the server unit 20 accesses the peripheral device and performs the processing (#828 in FIG. 17). If the object corresponds to processing not involving interaction with the peripheral device (NO at #827 in FIG. 17), the server unit 20 performs the processing corresponding to the object (#829 in FIG. 17) without accessing the peripheral device.

If the object corresponding to the touch position pertains to the screen of the MFP unit 10 (NO at #806 in FIG. 16, NO at #826 in FIG. 17, and YES at #830 in FIG. 17), the server unit 20 transfers the touch position data 7E to the MFP unit 10 (#831 in FIG. 17). Then, the MFP unit 10 performs processing in accordance with the touch position data 7E.

When a command is received from the MFP unit 10 (YES at #832 in FIG. 17), the server unit 20 performs processing in accordance with the command (#833 in FIG. 17). At this time, the server unit 20 cooperates with the peripheral device to perform the processing as necessary. If data is received from the peripheral device during the processing (YES at #834 in FIG. 17), the server unit 20 transfers the data to the MFP unit 10 (#835 in FIG. 17).

As long as power remains ON (NO at #836 in FIG. 17), the image forming apparatus 1 performs each of the foregoing processing as appropriate.

In accordance with the embodiment, the peripheral device can be made easier to use than before in the image forming apparatus 1 that includes the MFP unit 10 and the server unit 20 disposed in a single housing.

The embodiment has been described for a case in which the USB memory 4 is used as the peripheral device. The present invention can nonetheless be applied to a case in which any other device than the USB memory 4 is used as the peripheral device. The present invention may be applied to, for example, cases in which an input device such as a keyboard, a mouse, a biological information input device, and a card reader is used as the peripheral device.

In this case, the server unit 20 processes the input data in accordance with the current screen. When, for example, the current screen is the scan job screen 6A, the server unit 20 transfers the input data to the MFP unit 10. When the current screen is the browsing screen 6B, the server unit 20 causes the web browser to process the input data.

In the embodiment, the current screen is switched after the idling state is reached following the touch of the changeover button 6Da or the changeover button 6Db. The current screen may nonetheless be switched before the idling state is reached. In this case, however, the server unit 20 permits the application relating to the new current screen to access the USB memory 4 only after the idling state is reached.

In the embodiment, two communication paths are provided between the MFP unit 10 and the server unit 20. Nonetheless, a single communication path may be shared between the MFP unit 10 and the server unit 20.

The embodiment has been described for a case in which the USB is used as a peripheral device interface. The interface may nonetheless be a type complying with RS-232C, IEEE1394, or any other standard.

General or elemental configurations, details of processing performed, sequence in which steps are performed, and screen configurations of the image forming apparatus 1 may be changed as appropriate so as to suit the purpose of the present invention.

Although embodiments have been described and illustrated in detail, it is clearly understood that the same is by way of illustration and example only and not limitation, the scope of the present invention should be interpreted by terms of the appended claims.

What is claimed is:

1. An information processing apparatus comprising:
  a display;
  a first processing unit; and
  a second processing unit, wherein the first processing unit and the second processing unit are housed in a single housing,
  the first processing unit includes a transmitter configured to transmit a first screen relating to first processing performed by the first processing unit to the second processing unit,
  the second processing unit includes a mounting section in which a peripheral device is mounted and a hardware processor, wherein the peripheral device is not part of the first processing unit;
  the hardware processor configured to:
    cause the display to selectively display either one of the first screen and a second screen relating to second processing performed by the second processing unit, and
    when the display displays the first screen, allow the peripheral device to be used for the first processing and, when the display displays the second screen, allow the peripheral device to be used for the second processing;
  wherein the hardware processor facilitates integration of the first processing unit, the second processing unit, and the peripheral device.

2. The information processing apparatus according to claim 1, wherein the hardware processor causes the display to display a changeover image together with either one of the first screen and the second screen and, when the changeover image is selected while the first screen is being displayed, the hardware processor causes the display to display the second screen in place of the first screen and when the changeover image is selected while the second screen is being displayed, the hardware processor causes the display to display the first screen in place of the second screen.

3. The information processing apparatus according to claim 1, wherein, when a need arises to display the second screen while the peripheral device is being used for the first processing, the hardware processor causes the display to display the second screen after use of the peripheral device has been completed and, when a need arises to display the first screen while the peripheral device is being used for the second processing, the hardware processor causes the display to display the first screen after the use of the peripheral device has been completed.

4. The information processing apparatus according to claim 3, wherein the second processing unit further comprises:
  an acquisition module configured to acquire from the peripheral device information on a directory structure of the peripheral device when the peripheral device is a storage, wherein
  the hardware processor causes the display to display the information during a period of time that starts when a need arises to display the second screen while the peripheral device is being used for the first processing and ends when the use is completed or during a period of time that starts when a need arises to display the first screen while the peripheral device is being used for the second processing and ends when the use is completed.

5. The information processing apparatus according to claim 1, wherein, when the display displays the second screen in place of the first screen while the peripheral device is being used for the first processing, the hardware processor allows the peripheral device to be used for the second processing after the use has been completed and, when the display displays the first screen in place of the second screen while the peripheral device is being used for the second processing, the hardware processor allows the peripheral device to be used for the first processing after the use has been completed.

6. The information processing apparatus according to claim 1, wherein
  the first processing unit includes at least one of a printer and a scanner, and
  the second processing unit includes neither the printer nor the scanner.

7. The information processing apparatus according to claim 1, wherein the peripheral device is a detachable memory.

8. An information processing apparatus comprising:
a mounting section in which a peripheral device is mounted;
a receptor configured to receive from another apparatus a first screen relating to first processing performed by the other apparatus, wherein the peripheral device is not part of the other apparatus; and
a hardware processor configured to:
cause a display to selectively display either one of the first screen and a second screen relating to second processing performed by the information processing apparatus, and
when the display displays the first screen, allow the peripheral device to be used for the first processing and, when the display displays the second screen, allow the peripheral device to be used for the second processing;
wherein the hardware processor facilitates integration of the other apparatus, the information processing apparatus, and the peripheral device.

9. The information processing apparatus according to claim 8, wherein the hardware processor causes the display to display a changeover image together with either one of the first screen and the second screen and, when the changeover image is selected while the first screen is being displayed, the hardware processor causes the display to display the second screen in place of the first screen and when the changeover image is selected while the second screen is being displayed, the hardware processor causes the display to display the first screen in place of the second screen.

10. The information processing apparatus according to claim 8, wherein, when a need arises to display the second screen while the peripheral device is being used for the first processing, the hardware processor causes the display to display the second screen after use of the peripheral device has been completed and, when a need arises to display the first screen while the peripheral device is being used for the second processing, the hardware processor causes the display to display the first screen after the use of the peripheral device has been completed.

11. The information processing apparatus according to claim 10, wherein
the hardware processor acquires, when the peripheral device is a storage, information on a directory structure of the peripheral device from the peripheral device, and
the hardware processor causes the display to display the information during a period of time that starts when a need arises to display the second screen while the peripheral device is being used for the first processing and ends when the use is completed or during a period of time that starts when a need arises to display the first screen while the peripheral device is being used for the second processing and ends when the use is completed.

12. The information processing apparatus according to claim 8, wherein, when the display displays the second screen in place of the first screen while the peripheral device is being used for the first processing, the hardware processor allows the peripheral device to be used for the second processing after the use has been completed and, when the display displays the first screen in place of the second screen while the peripheral device is being used for the second processing, the hardware processor allows the peripheral device to be used for the first processing after the use has been completed.

13. The information processing apparatus according to claim 8, wherein the other apparatus includes at least one of a printer and a scanner.

14. A method for using a peripheral device in an information processing apparatus including a first processing unit, a second processing unit including a mounting section in which the peripheral device is mounted, wherein the peripheral device is not part of the first processing unit, and a display used by the first processing unit and the second processing unit, wherein the first processing unit and the second processing unit are housed in a single housing, the method comprising:
transmitting to the second processing unit, by the first processing unit, a first screen relating to first processing performed by the first processing unit;
causing, by the second processing unit, the display to selectively display either one of the first screen and a second screen relating to second processing performed by the second processing unit; and
when the display displays the first screen, allowing the peripheral device to be used for the first processing and, when the display displays the second screen, allowing the peripheral device to be used for the second processing, thus facilitating integration of the first processing unit, the second processing unit, and the peripheral device.

15. A non-transitory computer-readable storage medium storing a peripheral device use program that causes a computer including a mounting section in which a peripheral device is mounted to execute, the peripheral device use program causing the computer to execute:
receiving from another apparatus a first screen relating to first processing performed by the other apparatus, wherein the peripheral device is not part of the other apparatus;
causing a display to selectively display either one of the first screen and a second screen relating to second processing performed by the computer; and
when the display displays the first screen, allowing the peripheral device to be used for the first processing and, when the display displays the second screen, allowing the peripheral device to be used for the second processing;
wherein the program facilitates integration of the other apparatus, the information processing apparatus, and the peripheral device.

16. The non-transitory computer-readable storage medium according to claim 15, wherein the peripheral device use program further causes the computer to execute:
causing the display to display a changeover image together with either one of the first screen and the second screen; and
when the changeover image is selected while the first screen is being displayed, causing the display to display the second screen in place of the first screen and when the changeover image is selected while the second screen is being displayed, causing the display to display the first screen in place of the second screen.

17. The non-transitory computer-readable storage medium according to claim 15, wherein the peripheral device use program further causes the computer to execute:
when a need arises to display the second screen while the peripheral device is being used for the first processing, causing the display to display the second screen after use of the peripheral device has been completed; and
when a need arises to display the first screen while the peripheral device is being used for the second processing, causing the display to display the first screen after the use of the peripheral device has been completed.

18. The non-transitory computer-readable storage medium according to claim 17, wherein the peripheral device use program further causes the computer to execute:
  acquiring from the peripheral device information on a directory structure of the peripheral device when the peripheral device is a storage; and
  causing the display to display the information during a period of time that starts when a need arises to display the second screen while the peripheral device is being used for the first processing and ends when the use is completed or during a period of time that starts when a need arises to display the first screen while the peripheral device is being used for the second processing and ends when the use is completed.

19. The non-transitory computer-readable storage medium according to claim 15, wherein the peripheral device use program further causes the computer to execute:
  when the display displays the second screen in place of the first screen while the peripheral device is being used for the first processing, allowing the peripheral device to be used for the second processing after the use has been completed; and
  when the display displays the first screen in place of the second screen while the peripheral device is being used for the second processing, allowing the peripheral device to be used for the first processing after the use has been completed.

20. The non-transitory computer-readable storage medium storing a peripheral device use program that causes the computer to execute according to claim 15, wherein the other apparatus includes at least one of a printer and a scanner.

* * * * *